US009995940B2

(12) United States Patent
Tseng et al.

(10) Patent No.: US 9,995,940 B2
(45) Date of Patent: Jun. 12, 2018

(54) LAMINATED ALIGNMENT STRUCTURE FOR EYECUP ASSEMBLIES IN A VIRTUAL REALITY HEADSET

(71) Applicant: Oculus VR, LLC, Menlo Park, CA (US)

(72) Inventors: Shie Ping Jeffrey Tseng, Santa Clara, CA (US); Evan M. Richards, Santa Clara, CA (US); Shizhe Shen, San Mateo, CA (US)

(73) Assignee: Oculus VR, LLC, Menlo Park, CA (US)

( * ) Notice: Subject to any disclaimer, the term of this patent is extended or adjusted under 35 U.S.C. 154(b) by 187 days.

(21) Appl. No.: 15/158,388

(22) Filed: May 18, 2016

(65) Prior Publication Data

US 2016/0341953 A1 Nov. 24, 2016

Related U.S. Application Data

(60) Provisional application No. 62/163,309, filed on May 18, 2015.

(51) Int. Cl.
*G02B 27/01* (2006.01)
(52) U.S. Cl.
CPC ..... *G02B 27/0176* (2013.01); *G02B 27/0172* (2013.01); *G02B 27/01* (2013.01); *G02B 2027/0132* (2013.01); *G02B 2027/0181* (2013.01)
(58) Field of Classification Search
CPC .. G02B 27/01; G02B 27/017; G02B 27/0172; G02B 27/0176; G02B 2027/0132; G02B 2027/0181

USPC ........................................................ 351/158
See application file for complete search history.

(56) References Cited

U.S. PATENT DOCUMENTS

| 6,084,555 | A  | * | 7/2000 | Mizoguchi | G02B 7/12 345/8 |
| 6,480,174 | B1 | * | 11/2002 | Kaufmann | G02B 27/0172 345/7 |
| 7,901,072 | B1 | * | 3/2011 | Eagan | G02B 27/0172 351/158 |
| 9,176,325 | B2 | * | 11/2015 | Lyons | G02B 27/0172 |
| 9,788,714 | B2 | * | 10/2017 | Krueger | A61B 3/0041 |
| 2003/0184868 | A1 | * | 10/2003 | Geist | G02B 27/0172 359/630 |

(Continued)

*Primary Examiner* — William R Alexander
(74) *Attorney, Agent, or Firm* — Fenwick & West LLP (57) ABSTRACT

An eyecup assembly includes an electronic display element of a head-mounted display (HMD), a transparent plastic frame, an eyecup of the HMD, and a coupling interface. The plastic frame is laminated to the electronic display element and includes a center portion and a peripheral portion. The center portion includes an optical component and the peripheral portion including at least two protruding alignment structures. The eyecup includes alignment structures coupled to the at least two protruding alignment structures on the frame. The coupling interface interfaces with an alignment system. The alignment system is configured to align the eyecup assembly to the electronic display by adjusting a position of the electronic display relative to the eyecup so that a test image displayed by the electronic display after transmission through the optical component in the frame and an aperture of the eyecup is within a threshold value of a reference image.

28 Claims, 5 Drawing Sheets

(56) References Cited

U.S. PATENT DOCUMENTS

| | | | | |
|---|---|---|---|---|
| 2004/0008157 A1* | 1/2004 | Brubaker | ............... | G02B 27/017 345/8 |
| 2006/0168859 A1* | 8/2006 | Pombo | .................... | G02B 7/023 40/611.07 |
| 2007/0057867 A1* | 3/2007 | Mizuuchi | ................. | G02B 7/12 345/8 |
| 2012/0162764 A1* | 6/2012 | Shimizu | ............... | H04N 13/044 359/473 |
| 2012/0200918 A1* | 8/2012 | Rivkin | ................. | G02B 23/125 359/481 |
| 2015/0253574 A1* | 9/2015 | Thurber | ............. | G02B 27/0172 359/630 |
| 2016/0011422 A1* | 1/2016 | Thurber | ................. | G02B 27/64 345/8 |
| 2016/0063767 A1* | 3/2016 | Lee | ....................... | G06T 19/006 345/419 |
| 2016/0091720 A1* | 3/2016 | Stafford | ............. | G02B 27/0172 345/8 |

* cited by examiner

LAMINATED ALIGNMENT STRUCTURE FOR EYECUP ASSEMBLIES IN A VIRTUAL REALITY HEADSET

CROSS-REFERENCE TO RELATED APPLICATIONS

This application claims the benefit of prior co-pending U.S. Provisional Patent Application No. 62/163,309, filed May 18, 2015, the disclosure of which is hereby incorporated by reference in its entirety.

BACKGROUND

The present disclosure generally relates to alignment of components of virtual reality (VR) headsets, and specifically relates to alignment of eyecup assemblies to displays of the VR headsets.

Increases in pixel density, viewing optics resolution, field of view, etc., of VR headsets has reduced the optical alignment tolerances of optical components in the VR headsets. Currently, 6-axis alignment of optical components within the VR headset is a multi-step process, which is rather inefficient for large scale production of VR headsets. Moreover, in some cases once an optical component is fixed into a particular position it may not be later adjusted, which can cause problems if, for example, the optical component was fixed in the wrong position, alignment is lost, etc.

SUMMARY

An eyecup assembly includes an electronic display element of a head-mounted display (HMD), a plastic frame, an eyecup of the HMD, and a coupling interface. The plastic frame is laminated to the electronic display element. The frame includes a center portion and a peripheral portion that circumscribes the center portion. The center portion includes an optical component and the peripheral portion includes at least two protruding alignment structures. The center portion of the frame is transparent. In some embodiments the peripheral portion is also transparent. The eyecup of the HMD includes alignment structures coupled to the at least two protruding alignment structures on the frame. The coupling interface interfaces with an alignment system. The alignment system is configured to align the eyecup assembly to the electronic display of the HMD by adjusting a position of the electronic display relative to the eyecup so that a test image displayed by the electronic display after transmission through the optical component in the frame and an aperture of the eyecup is within a threshold value of a reference image.

The alignment structures of the eyecup are affixed to the corresponding protruding alignment structures of the frame to form corresponding rigid mounting points. The rigid mounting points are detachable (e.g., user may break them off), to allow for realignment of the electronic display element to the eyecup without having to disregard either component. Once re-aligned, additional alignment structures of the eyecup may be affixed to additional protruding alignment structures of the frame to form new rigid mounting point.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
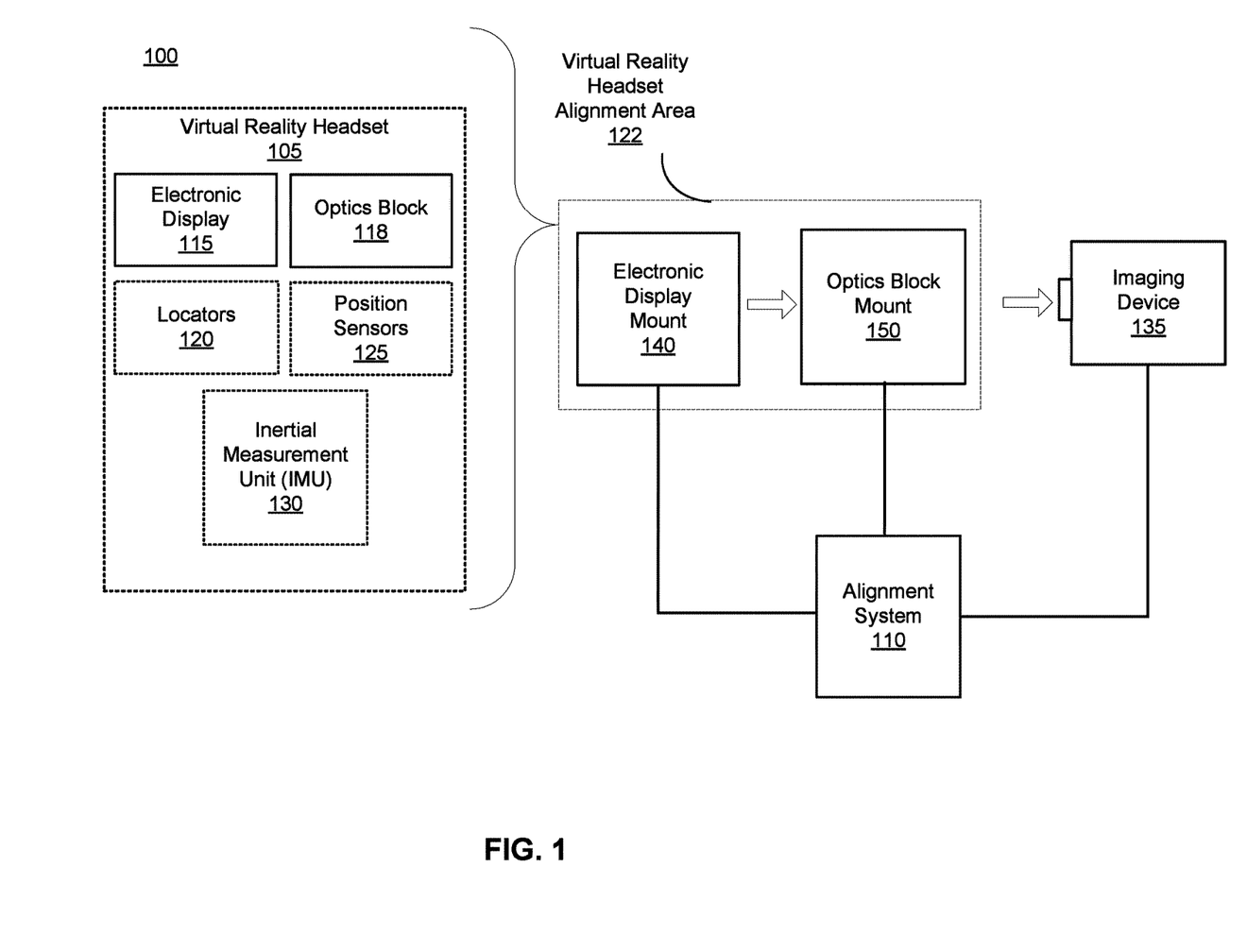
FIG. 1 is a block diagram of an alignment system, in accordance with an embodiment.

FIG. 1 is a block diagram of a system environment 100 in which an alignment system 110 operates. The system environment 100 shown by FIG. 1 comprises an alignment system 110, a virtual reality (VR) headset alignment area 122, and an imaging device 135. While FIG. 1 shows an example system 100 including one alignment system 110, one VR headset alignment area 122, and one imaging device 135, in other embodiments any number of these components may be included in the system 100. For example, there may be multiple VR headset alignment areas 122 and imaging devices 132 communicating with the alignment system 110. In alternative configurations, different and/or additional components may be included in the system environment 100.

A VR headset 105 is a head-mounted display (HMD) that presents media to a user and is part of a VR system (not shown). In some embodiments, the HMD 105 may also present augmented reality and/or mixed reality to a user. Examples of media presented by the VR headset 105 include one or more images, video, audio, or some combination thereof. In some embodiments, audio is presented via an external device (e.g., speakers and/or headphones) that receives audio information from the VR headset 105. Some embodiments of the VR headset 105 are further described below in conjunction with FIGS. 2A, 2B, and 3. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user. In various embodiments, the electronic display 115 may comprise a single electronic display element or multiple electronic display elements (e.g., a display for each eye of a user). Examples of the electronic display 115 include: a liquid crystal display (LCD), an organic light emitting diode (OLED) display, an active-matrix organic light-emitting diode display (AMOLED), liquid crystal on silicon (LCOS) display, some other display, or some combination thereof.

The optics block 118 magnifies received light, corrects optical errors associated with the image light, and presents the corrected image light to a user of the VR headset 105. In various embodiments, the optics block 118 includes one or more optical elements. Example optical elements included in the optics block 118 include: an aperture, a Fresnel lens, a convex lens, a concave lens, a filter, or any other suitable optical element that affects image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the content presented by the electronic display 115. For example, the field of view of the displayed content is such that the displayed content is presented using almost all (e.g., 110 degrees diagonal), and in some cases all, of the user's field of view. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The optics block 118 includes an eyecup assembly for each eye. Each eyecup assembly includes a frame and a cone which are discussed in detail below with regard to FIGS. 4 and 5. The frame is a structure that includes an optical component (e.g., micro lens array, low pass filter, etc.) and at least two alignment structures. Mechanical (e.g., alignment structures 460 and peripheral portion 440 in FIG. 4) and optical components of the frame can be made at the same step in the fabrication process using, for example, injection molding or diamond turning. In alternate embodiments, the frame is first created (using e.g., injection molding, diamond turning, casting, etc.) and then the optical component is applied to a center portion of the frame (e.g., center portion 430 in FIG. 4). In some embodiments, the frame and/or the optical element may be made out of transparent or partially transparent plastic. The optical element may be created through imprinting/stamping, lamination of an optical film (such as something made in a roll-to-roll imprinting process), coating, lithography, or other processed that make the optical element. In some embodiments, the frame may also contain coupling features that couple to an electronic display element of the electronic display 115. Coupling features may be, e.g., clips, snaps, points of adhesive, some other mechanism that acts to hold the frame in position relative to an electronic display element, or some combination thereof. The frame is aligned to the electronic display panel. In some embodiments, the coupling features are to hold the frame to the electronic display element and no fine alignment is needed. In other embodiments, the frame and/or electronic display element may contain one or more fiducials which may be used by to align the frame to the electronic display element. In some embodiments, once the frame and the electronic display element are aligned, the frame is attached to the electronic display panel using a lamination process to create a laminated frame element. A frame that is bonded to an electronic display element is referred to as a laminated frame element. In some embodiments, an optically clear adhesive may be used to bond the frame to the electronic display panel. In alternate embodiments, no adhesive is used—and the frame is held in position relative to the electronic display element via the coupling features.

The cone includes an entrance aperture and an exit aperture, and at least two complementary alignment structures that are configured to interface with corresponding alignment structures on the frame. The cone is configured to couple to the frame such that image light (e.g., a test image) from the electronic display 115 passes through the optical component of the frame and then into the entrance aperture of the cone. The image light propagates through the interior of the cone and exits the cone via the exit aperture. In some embodiments, the exit aperture includes an additional optical component (e.g., a lens) that adjusts the image light (e.g., magnifies, optically corrects, etc.) and directs it to a user wearing the VR headset 105 or the imaging device 135.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to a VR system (not shown), which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

In some embodiments, one or more components of the VR headset 105 are coupled to an internal sub-frame. A sub-frame is one or more structures that internal components (e.g., electronic display 115 and/or the optics block 118) of the VR headset 105 are affixed. In some embodiments, the electronic display 115 is mounted on a sub-frame that couples to the VR headset 105. The sub-frame may also include one or more components of the optics block 118 (e.g., eyecup assembly). In some embodiments, the sub-frame is such that components mounted to it are in rough optical alignment. The components could then be finely aligned using the alignment system 110. Additionally, in some embodiments, the sub-frame includes one or more fiducials which the alignment system 110 may use to align one or more component of the VR headset 105 to some, or all, of the fiducials.

The VR headset alignment area 122 includes a plurality of mounts that facilitate optical alignment of components in one or more VR headsets 105. The mounts are configured to adjust positions of components of the VR headset (e.g., an electronic display 114) responsive to instructions from the alignment system 110. In some embodiments, users of the alignment system 110 may manually adjust a position of an optical component coupled to a mount. As discussed below, the VR headset alignment area 122 includes an electronic display mount 140 and an optics block mount 150. In alternate embodiments, other mounts may also be included within the VR headset alignment area 122.

The electronic display 115 couples to the electronic display mount 140 in the VR headset alignment area 122. The electronic display mount 140 is configured to adjust the position of the electronic display 115 across six degrees of freedom (i.e., forward/backward, up/down, left/right (translation in three perpendicular axes) combined with rotation about three perpendicular axes, often termed pitch, yaw, and roll). In some embodiments, the position of the electronic display 115 is adjusted responsive to instructions received by the electronic display mount 140 from the alignment system 110. Additionally, in some embodiments, a user may also manually adjust the position of the electronic display 115 via ad adjustment to the electronic display mount 140.

Some or all of the components of the eyecup assembly couple to an optics block mount 150 in the VR headset alignment area 122. The optics block mount 150 is configured to adjust the position of components of the optics block 118 (e.g., components of the eyecup assembly) across six degrees of freedom (i.e., forward/backward, up/down, left/right (translation in three perpendicular axes) combined with rotation about three perpendicular axes, often termed pitch, yaw, and roll). In some embodiments, the position of components of the optics block 118 are adjusted responsive to instructions received by the optics block mount 150 from the alignment system 110. Additionally, in some embodiments, a user may also manually adjust the position of one or more components of the optics block 118 via ad adjustment to the optics block mount 150.

In some embodiments, the electronic display mount 140 and the optics block mount 150 are configured to interface with a sub-frame that has an electronic display and one or more components of the optics block 118 mounted to it.

The imaging device 135 is a camera configured to capture image data from the VR headset alignment area 122. In some embodiments, the imaging device 135 is positioned in location that would correspond to an eye of a user wearing the VR headset 105 looking along an optical axis toward the electronic display mount 140. During and/or after operation, the imaging device 135 communicates captured images to the alignment system 110. Additionally, in some embodiments, a user and/or the alignment system 110 may adjust a position of the imaging device 135 and/or one or more imaging parameters (e.g., focal length, focus, frame rate, ISO, sensor temperature, shutter speed, aperture, etc.).

The alignment system 110 actively aligns one or more components of the optics block 118 to the electronic display 115 using the electronics display mount 140, the optics block mount 150, and the imaging device 135. One or more electronic display elements of the electronics display 115 are coupled to the electronic display mount 140 and components of the optics block 118 (e.g., eyecup assembly) are coupled to the optics block 118.

The alignment system 110 causes an electronic display element to display a test image. A test image is an image which the alignment system 110 uses for alignment. In some embodiments a test image is a target at different locations on the electronic display element (e.g., center and each corner of the display). A test image has a corresponding reference image which represents an ideal version of the test image as it should appear at the imaging device 135 if the electronic display 115 and one or more components of the optics block 118 (e.g., frame and/or cone) are in alignment. In some instances, the reference image is identical to the alignment image. The alignment system 110 compares the image data received from the imaging device 135 to its reference image. If differences in the two images are greater than a threshold value, the alignment system 110 determines what adjustments reduce the difference in the two images, and then adjusts the position of the electronic display 115 via the electronic display mount 140 and/or the one or more components of the optics block 118 (e.g., eyecup assembly) via the optics block mount 150 until the difference in the image data and the reference image is less than the threshold value.

In some embodiments, the alignment system 110 adjusts a position of an optical component for translation (lateral/vertical displacement in x and y) and rotation in a single step. The alignment system 110 then scans the optical component via its mount through various positions along optical axis (z) and through various positions of pitch/yaw to correct for focus and tilt, respectively. Once the components are aligned a user may fix the components in place (e.g., mechanically, adhesive, etc.) in the VR headset 105 and/or a sub-frame of the VR headset 105.

For example, an optically transparent adhesive may be applied to a frame and/or electronic display element. The alignment system 110 may adjust a position of the frame relative to the electronic display element until the difference in the image data and the reference image is less than the threshold value. The adhesive may then be cured (e.g., via UV light or some other method) to laminate the electronic display element to the frame to create a laminated frame element. The alignment system 110 then aligns the laminated frame element with a cone. Once the cone is aligned to the laminated frame element, a user may couple (e.g., mechanically, using adhesive, etc.) two different alignment structures on the frame that couple to complementary alignment structures on the cone to create two rigid mounting points.

In some instances alignment is lost between an eyecup assembly and an electronic display element. However, instead of having to discard the laminated frame element, which contains an optical component (e.g., micro lens array), and re-align with a new frame, the existing laminated frame element may still be used. As noted above, and again discussed in detail below with respect to FIGS. 5 and 6, the frame includes a plurality of alignment structures and the cone includes a plurality of corresponding complementary alignment structures. Accordingly, if alignment is lost between the cone and a corresponding electronic display element that is part of the laminated frame element, the user may break off the rigid mounting points, re-align the cone to the electronic display 115 that is part of the laminated frame element, and affix (e.g., mechanically, with adhesive, etc.,) two different alignment structures to their corresponding complementary alignment structures to create two new rigid mounting points.

Figure 2A:
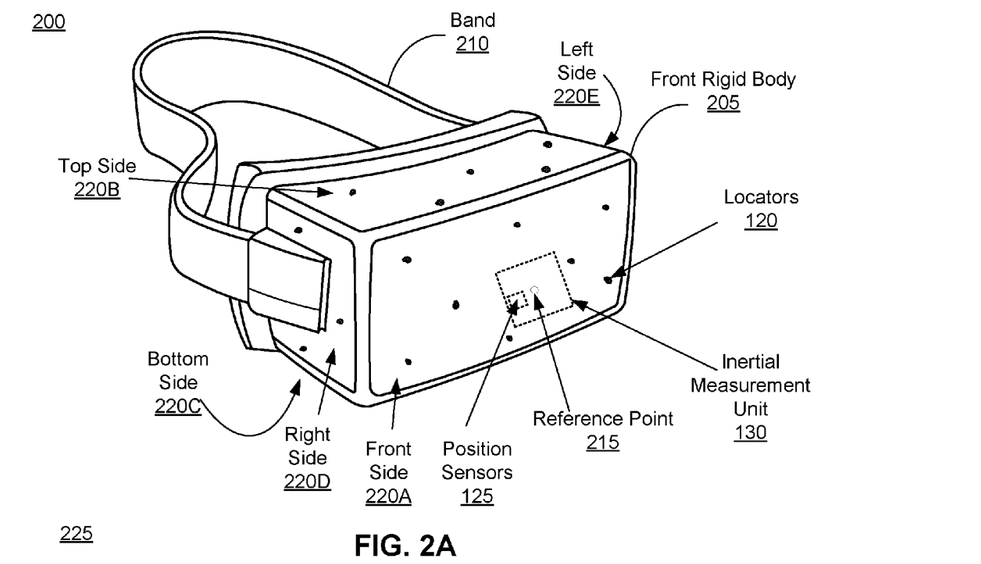
FIG. 2A is a diagram of a virtual reality (VR) headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
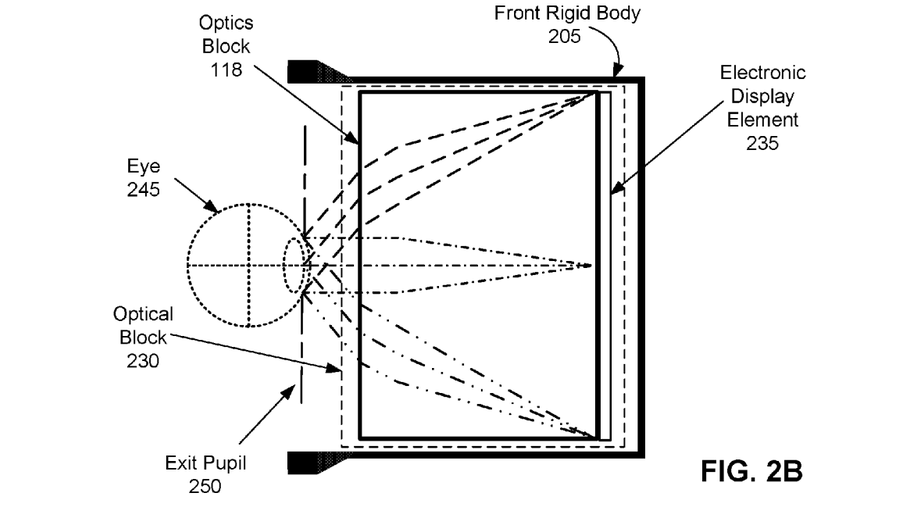
FIG. 2B is a cross section of the front rigid body of the embodiment of the VR headset shown in FIG. 2A.

FIG. 2B is a cross section 225 of the front rigid body 205 of the embodiment of the VR headset 200 shown in FIG. 2A. As shown in FIG. 2B, the front rigid body 205 includes an optical block 230 that provides altered image light to an exit pupil 250. The exit pupil 250 is a location where a user's eye 245 is positioned while using the VR headset 200. For purposes of illustration, FIG. 2B shows a cross section 225 associated with a single eye 245, but another optical block, separate from the optical block 230, provides altered image light to another eye of the user.

The optical block 230 includes an electronic display element 235 of the electronic display 115, and the optics block 118. The electronic display element 235 emits image light toward the optics block 118. In some embodiments, the optics block 118 corrects for one or more optical errors (e.g., distortion, astigmatism, etc.) via one or more optical elements or other components. The optics block 118 directs, via an eyecup assembly (not shown), corrected image light to the exit pupil 250 for presentation to the user. In some embodiments, optical elements for correcting one or more optical errors included in the eyecup assembly.

Figure 3:
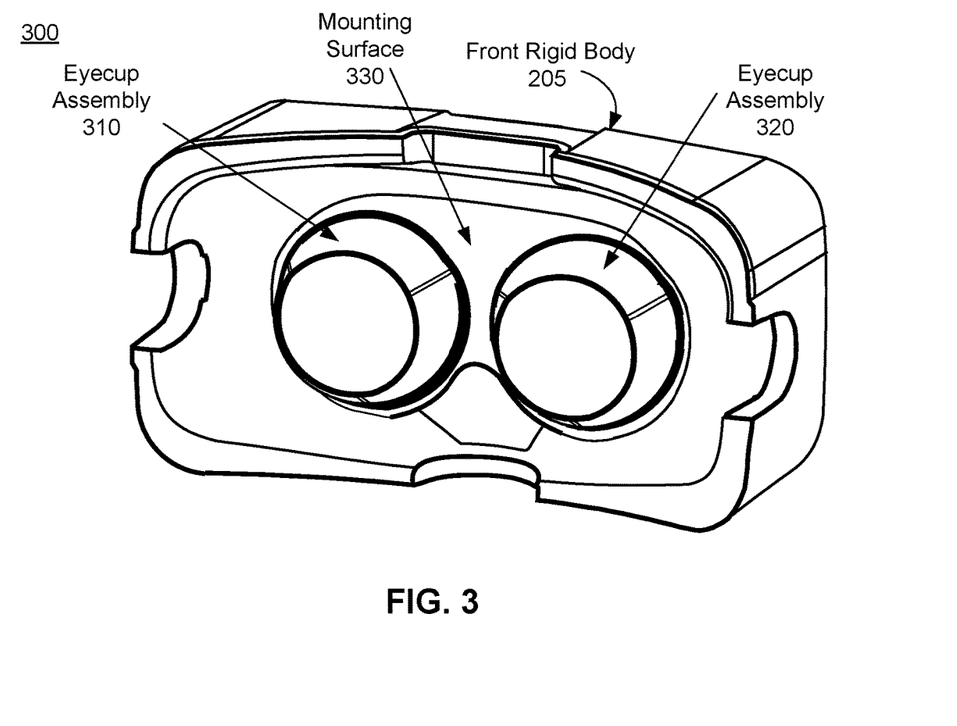
FIG. 3 is another view of the front rigid body of the embodiment of the virtual reality headset shown in FIG. 2A.

FIG. 3 is another view of the front rigid body 205 of the embodiment of the virtual reality headset shown in FIG. 2A. The front rigid body 205 includes a left eyecup assembly 310 and a right eyecup assembly 320 that are mounted to a mounting surface 330. In some embodiments, the mounting surface 330 is a surface on a sub-frame coupled to the front rigid body 205.

Figure 4:
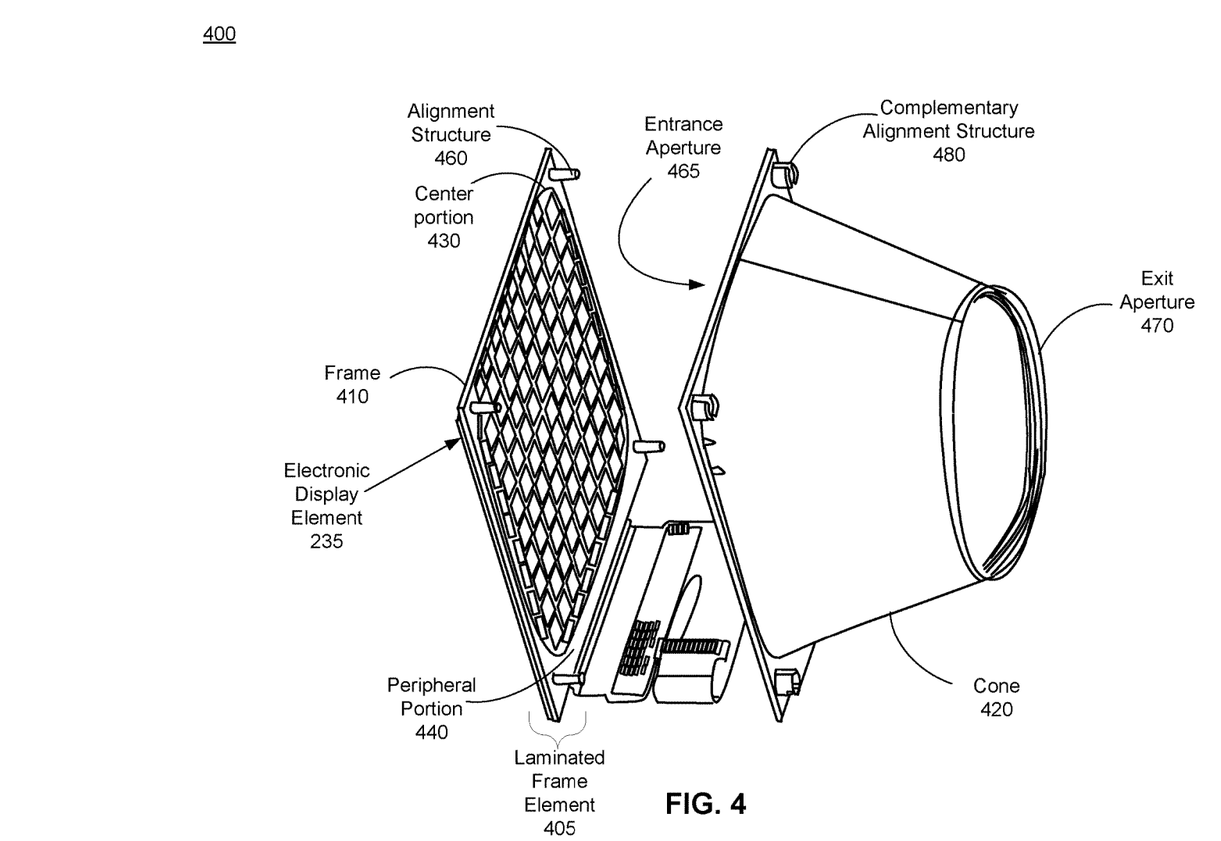
FIG. 4 is a diagram of a laminated frame element and a cone of an eyecup assembly of a VR headset, according to an embodiment.

FIG. 4 is a diagram 400 of a laminated frame element 405 and a cone 420 of an eyecup assembly of a VR headset 105, according to an embodiment. The laminated frame element 405 is a frame 410 that has been laminated to the electronic display element 235. The frame 410 is a structure that couples to the cone 420 and includes an optical component. The optical component may be, e.g., a micro lens array, a low pass filter, a Fresnel lens, or some other optical element that affects the light emitted from the electronic display element 235. The frame is made out of plastic, and in some embodiments, is manufactured as part of the same process that is used to form the optical component (e.g., micro lens array). In some embodiments, the frame is plastic that is transparent to light emitted from the electronic display element 235.

The frame 410 includes a center portion 430 and a peripheral portion 440. The center portion 430 includes the optical component, and is circumscribed by the peripheral portion 440. In FIG. 4, the peripheral portion 440 includes four alignment structures 460. In this embodiment, each of the alignment structures 460 is a protruding alignment structure. In some embodiments, the frame 410 is a single monolithic structure. In other embodiments, the frame 410 is constructed of separate parts that are bonded together (e.g., the center portion 430 bonded to the peripheral portion 440).

The cone 420 funnels light from an entrance aperture 465 to an exit aperture 470. The cone 420 is composed of a material (e.g., plastic, thermoplastic polyurethane, etc.) that is opaque to visible light. In some embodiments, the cone 420 may also be deformable, such that a deformation distance between the entrance aperture 465 to the exit aperture 470 may be altered. In FIG. 4, the cone 420 includes four complementary alignment structures 480 that correspond to, and may be coupled to, the alignment structures 460 on the frame. In other embodiments, the cone 420 includes a different number of complementary alignment structures 480.

The cone 420 is configured to couple to the frame 410 such that image light from the electronic display element 235 passes through the optical component of the frame 410 and then into the entrance aperture 465 of the cone 420. In some embodiments, the exit aperture 470 may be coupled to a lens (not shown).

Figure 5:
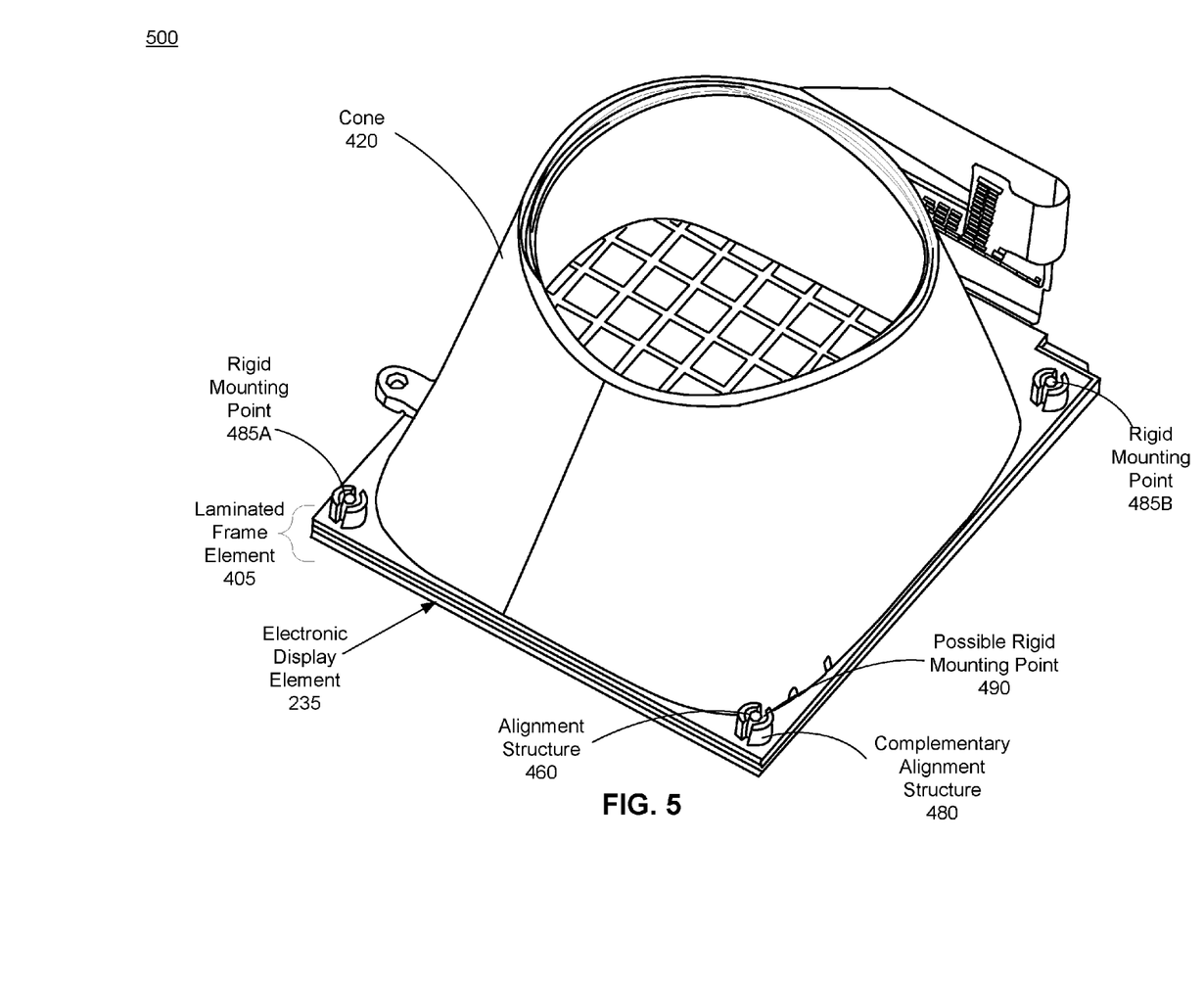
FIG. 5 is a diagram of a laminated frame element coupled to a cone of an eyecup assembly of a VR headset, according to an embodiment.

FIG. 5 is a diagram 500 of a laminated frame element 405 coupled to a cone 420 of an eyecup assembly of a VR headset 105, according to an embodiment. The laminated frame element 405 includes a frame 410. A plurality of the alignment structures 460 on the frame 410 are coupled to complementary alignment structures 480 on the cone 420 to create at least two rigid mounting points 485A and 485B. For example, a user may use an adhesive to couple an alignment structure 460 to its corresponding alignment structure 480. In alternate embodiments, the alignment structures 460 and the complementary alignment structures 480 may have some other means of coupling together—e.g., they may mechanically couple such that one snaps into the other.

As discussed above with reference to FIG. 1, in some instances two rigid mounting points 485A and 485B might fix the cone 420 relative to the frame 410 in a position that does not allow proper alignment to the electronic display element 235 which is part of the laminated frame element 405. Conventionally, a user would then have to break off the cone and replace it with a new cone or possibly have to replace the entire eyecup assembly. In contrast, instead of having to discard the laminated frame element 405 and/or cone 420, the existing laminated frame element 405 and cone 420 may be re-used. A user may simply break off the rigid mounting point 485A and/or the rigid mounting point 485B, reposition the frame 410 and/or cone 420 and then affix (e.g., using adhesive, a mechanical coupling, etc.) one or more different alignment structures 460 to their corresponding complementary alignment structures 480 to create one or more new rigid mounting points 485. For example, in FIG. 5, there is a possible rigid mounting point 490 which a user may affix its alignment structure 460 to its corresponding alignment structure 480 to create a new rigid mounting point 485.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An eyecup assembly comprising:
    an electronic display element of a head-mounted display (HMD);
    a transparent plastic frame that is laminated to the electronic display element, the frame including a center portion and a peripheral portion that circumscribes the center portion, the center portion including an optical component and the peripheral portion including at least two protruding alignment structures;
    an eyecup of the HMD, the eyecup including alignment structures coupled to the at least two protruding alignment structures on the frame; and
    a coupling interface that interfaces with an alignment system that is configured to align the eyecup assembly to the electronic display of the HMD by adjusting a position of the electronic display relative to the eyecup so that a test image displayed by the electronic display after transmission through the optical component in the frame and an aperture of the eyecup is within a threshold value of a reference image.

2. The eyecup assembly of claim 1, wherein the optical component is selected from a group consisting of: a micro lens array, a low pass filter, a Fresnel lens, and some other optical element that affects the light emitted from the electronic display element.

3. The eyecup assembly of claim 1, wherein the frame and the optical component are a single monolithic device.

4. The eyecup assembly of claim 1, wherein the alignment structures are affixed to the at least two protruding alignment structures on the frame to create corresponding rigid mounting points.

5. The eyecup assembly of claim 4, wherein one or more of the rigid mounting points are detachable from the eyecup assembly.

6. The eyecup assembly of claim 4, wherein the peripheral portion of the frame includes an additional protruding alignment structure and the eyecup includes an additional alignment structure.

7. The eyecup assembly of claim 1, wherein the alignment structures are affixed to the at least two protruding alignment structures on the frame via an adhesive to create corresponding rigid mounting points.

8. The eyecup assembly of claim 1, wherein the alignment structures are affixed to the at least two protruding alignment structures on the frame via a mechanical coupling to create corresponding rigid mounting points.

9. The eyecup assembly of claim 1, wherein the frame includes at least one fiducial for optical alignment of the frame to the electronic display element.

10. The eyecup assembly of claim 1, wherein the electronic display element includes at least one fiducial for optical alignment of the frame to the electronic display element.

11. An eyecup assembly comprising:
    an electronic display element of a head-mounted display (HMD);
    a plastic frame that is laminated to the electronic display element, the frame including a center portion and a peripheral portion that circumscribes the center portion, the center portion including an optical component and the peripheral portion including at least two protruding alignment structures;
    an eyecup of the HMD, the eyecup including alignment structures coupled to the at least two protruding alignment structures on the frame; and
    a coupling interface that interfaces with an alignment system that is configured to align the eyecup assembly to the electronic display of the HMD by adjusting a position of the electronic display relative to the eyecup so that a test image displayed by the electronic display after transmission through the optical component in the frame and an aperture of the eyecup is within a threshold value of a reference image.

12. The eyecup assembly of claim 11, wherein the optical component is selected from a group consisting of: a micro lens array, a low pass filter, a Fresnel lens, and some other optical element that affects the light emitted from the electronic display element.

13. The eyecup assembly of claim 11, wherein the frame and the optical component are a single monolithic device.

14. The eyecup assembly of claim 11, wherein the alignment structures are affixed to the at least two protruding alignment structures on the frame to create corresponding rigid mounting points.

15. The eyecup assembly of claim 14, wherein one or more of the rigid mounting points are detachable from the eyecup assembly.

16. The eyecup assembly of claim 14, wherein the peripheral portion of the frame includes an additional protruding alignment structure and the eyecup includes an additional alignment structure.

17. The eyecup assembly of claim 11, wherein the alignment structures are affixed to the at least two protruding alignment structures on the frame via an adhesive to create corresponding rigid mounting points.

18. The eyecup assembly of claim 11, wherein the alignment structures are affixed to the at least two protruding alignment structures on the frame via a mechanical coupling to create corresponding rigid mounting points.

19. The eyecup assembly of claim 11, wherein the frame includes at least one fiducial for optical alignment of the frame to the electronic display element.

20. The eyecup assembly of claim 11, wherein the center portion of the frame is transparent.

21. An eyecup assembly comprising:
a transparent plastic frame that is laminated to an electronic display element of a head-mounted display (HMD), the frame including a center portion and a peripheral portion that circumscribes the center portion, the center portion including an optical component and the peripheral portion including at least two protruding alignment structures; and
an eyecup of the HMD, the eyecup including alignment structures coupled to the at least two protruding alignment structures on the frame, wherein an alignment system is configured to align the eyecup assembly to the electronic display of the HVID by adjusting a position of the electronic display relative to the eyecup so that a test image displayed by the electronic display after transmission through the optical component in the frame and an aperture of the eyecup is within a threshold value of a reference image.

22. The eyecup assembly of claim 21, wherein the optical component is selected from a group consisting of: a micro lens array, a low pass filter, a Fresnel lens, and some other optical element that affects the light emitted from the electronic display element.

23. The eyecup assembly of claim 21, wherein the frame and the optical component are a single monolithic device.

24. The eyecup assembly of claim 21, wherein the alignment structures are affixed to the at least two protruding alignment structures on the frame to create corresponding rigid mounting points.

25. The eyecup assembly of claim 24, wherein one or more of the rigid mounting points are detachable from the eyecup assembly.

26. The eyecup assembly of claim 24, wherein the peripheral portion of the frame includes an additional protruding alignment structure and the eyecup includes an additional alignment structure.

27. The eyecup assembly of claim 21, wherein the frame includes at least one fiducial for optical alignment of the frame to the electronic display element.

28. The eyecup assembly of claim 21, wherein the electronic display element includes at least one fiducial for optical alignment of the frame to the electronic display element.

* * * * *

UNITED STATES PATENT AND TRADEMARK OFFICE
CERTIFICATE OF CORRECTION

PATENT NO. : 9,995,940 B2
APPLICATION NO. : 15/158388
DATED : June 12, 2018
INVENTOR(S) : Shie Ping Jeffrey Tseng et al.

Page 1 of 1

It is certified that error appears in the above-identified patent and that said Letters Patent is hereby corrected as shown below:

In the Claims

Column 11, Line 24, after "display of the" delete "HIVID" and insert -- HMD --.

Signed and Sealed this
Eleventh Day of December, 2018

Andrei Iancu
*Director of the United States Patent and Trademark Office*